United States Patent

Simmons et al.

Patent Number: 5,406,472
Date of Patent: Apr. 11, 1995

[54] MULTI-LANE CONTROLLER

[75] Inventors: John R. Simmons; Peter D. Smout; James Tipton, all of Solihull, England

[73] Assignee: Lucas Industries plc, West Midlands, England

[21] Appl. No.: 985,031

[22] Filed: Dec. 3, 1992

[30] Foreign Application Priority Data

Dec. 6, 1991 [JP] Japan ................................. 9125975

[51] Int. Cl.⁶ ............................................ G06F 15/46
[52] U.S. Cl. ............................. 364/133; 364/268.1; 364/944.61; 364/184; 395/325; 370/85.11
[58] Field of Search ............. 364/133, 431.01, 431.04, 364/944.61, 184, 187, 268–268.8; 370/85.11, 14, 16; 395/325

[56] References Cited

U.S. PATENT DOCUMENTS 5,067,080 11/1991 Farman ........................... 364/431.04
5,086,499 2/1992 Mutone ................................. 364/200

FOREIGN PATENT DOCUMENTS 0211500  2/1987  European Pat. Off. .
0399308  11/1990 European Pat. Off. .
9108535  6/1991  European Pat. Off. .
2045968  11/1980 United Kingdom .
2149939  6/1985  United Kingdom .
2170336  7/1986  United Kingdom .
2200225  7/1988  United Kingdom .
2237904  5/1991  United Kingdom .

Primary Examiner—Roy N. Envall, Jr.
Assistant Examiner—Cameron H. Tousi
Attorney, Agent, or Firm—Staas & Halsey

[57] ABSTRACT

A multi-lane controller providing redundancy comprises two lanes. Each lane comprises an input/output interface, a data flow controller and a control data processor. Each data flow controller receives input data from and supplies output data to both input/output interfaces. The information exchange between each lane does not rely on the proper operation of either the control data processor or data flow controller of any of the lanes.

9 Claims, 3 Drawing Sheets

MULTI-LANE CONTROLLER

BACKGROUND OF THE INVENTION

The present invention relates to a multi-lane controller. Such a controller may be used for gas turbine engines, for instance for use as aero-engines.

A system in which control is primarily or wholly effected by signals from digital data processors, such as computers, is commonly referred to as a full authority digital control system. In order to increase the reliability of such a system, it is known to provide duplicated control channels or "lanes" each of which includes a data processor and its associated input and output devices. At any time, one of the lanes controls the engine and the other is in a stand-by mode. Internal self-monitoring of each computer is provided and, should a fault occur in the computer of the lane which is presently in control, this lane is deactivated and the other lane changes from stand-by operation to being in control.

In order to improve the fault detection and/or accommodation capability of a dual lane control system, it is known to provide cross-coupling of information between the lanes. In one known arrangement, a serial data highway is provided between the data processors in the two lanes so as to exchange predetermined data. Such an arrangement is shown in FIG. 1 (Prior Art) of the accompanying drawings, in which lane A comprises an input-output interface 1a and a computer 2a, lane B comprises an input/output interface 1b and a computer 2b, a lane selector 3 selects which of lanes A and B is in control, and a serial data highway 4 is provided between the computers 2a and 2b. However, such an arrangement requires that both lanes must be working correctly for the cross coupling to be operative. Also, there is an additional processing delay associated with the data received from the computer of the other lane which affects the tolerance which can be applied to cross comparison safety checks. Further, the process delay can also affect control performance if substitute data is used in the main control loops.

FIG. 2 (Prior Art) of the accompanying drawings illustrates another known arrangement with like parts being referred to by the same reference numerals. This arrangement provides cross-coupling by connecting the interfaces 1a and 1b of both lanes to the computer (2a in FIG. 2) which is presently in control. The lane selector 3 controls electronic switches 5a and 5b which connect the computer in control 2a to the interfaces 1a and 1b and disconnect the computer in standby 2b from the interfaces. This arrangement avoids the process delay problems of the arrangement of FIG. 1 because the lane in control has direct access to all input and output functions. Further, continued exchange of data is possible following failure of either processor. However, this arrangement is more complex and has the disadvantage that the computer in the standby lane is disconnected from the interfaces and hence is only able to perform background housekeeping tasks. Thus, when it becomes necessary to put lane A in standby and lane B in control, the lane B has to be initialised, with associated delays and software complexity.

EP 0 435613 describes a redundant system comprising a plurality of channels each divided into a sensor block and a computational block. A bus interface controller in each channel interfaces the sensor and computational blocks within that channel and co-ordinates transfer of sensor information to and from the computational block. The bus interface controllers exchange information with one another. Thus if a computational block fails, cross channel transfer of sensor information can continue; if one sensor block fails, the processing facilities of that channel can still be utilised. However, this system has the disadvantage that sensor data in a first channel may only be accessed by the computational block of a second channel via the bus interface of the first channel. The system therefore relies on the integrity of the bus interface controller.

SUMMARY OF THE INVENTION

According to the present invention, there is provided a multi-lane controller comprising a first lane, a second lane, and a lane selector, the first lane comprising a first control data processor connected via a first data flow controller and a first input/output interface to a first lane input and output, the second lane comprising a second control data processor connected via a second data flow controller and a second input/output interface to a second lane input and output, each of the first and second data flow controllers being arranged to receive input data from the first and second interfaces and to supply the input data to the respective control data processor, the first and second data flow controllers being arranged to supply output data from the first and second control data processors to the first and second interfaces, respectively, the lane selector being arranged to permit the supply of output data to the output of one of the first and second lanes and to inhibit the supply of output data to the output of the other of the first and second lanes.

Preferably, the lane selector is arranged, upon detection of a first fault in the one lane, to inhibit the supply of output data to the output of the one lane and to permit the supply of output data to the output of the other lane. Preferably the first and second data flow controllers are arranged to supply output data from the first and second control data processors to the second and first interfaces, respectively. Preferably the lane selector is arranged, upon detection of the first fault in the control data processor of the one lane and upon detection of a subsequent second fault in the interface of the other lane, to permit the supply of output data from the processor of the other lane via the interface of the one lane to the output of the one lane and to inhibit the supply of output data to the output of the other lane. Preferably the lane selector is arranged, upon detection of a fault in one of the first and second data flow controllers, to inhibit operation of the one data flow controller.

Preferably the data flow controller of each one of the lanes comprises a first read/write memory having a write input connected to the control data processor of the one lane and a read output connected to the interface of the one lane, a second read/write memory having a write input connected to the control data processor of the one lane and a read output connected to the interface of the other lane, a third read/write memory having a write input connected to the interface of the one lane and a read output connected to the control data processor of the one lane, and a fourth read/write memory having a write input connected to the interface of the other lane and a read output connected to the control data processor of the one lane.

Preferably each of the first and second interfaces comprises an interface data processor. Preferably each interface data processor is arranged to perform scaling of input data and/or validation of input data and/or motivation of an output drive. The motivation of the output drive may comprise direct control of a servo control loop. Each of the interface data processors may have a sample rate clock and means for synchronising the sample rate clocks. Each of the interface data processors may have means for substituting the sample rate clock of the other interface data processor in the event of failure of its sample rate clock. Each of the control data processors and interface data processors may have a watchdog timer whose output is connected to the lane selector.

It is thus possible to provide a controller in which each control data processor has access to input information from all of the lanes but only a control data processor currently in control has active control of outputs of the controller, the outputs of other control data processors being effectively disabled. Furthermore a control data processor of one lane wishing to access the input/output interface of another lane does not require the control data processor or data flow controller of the other lane to be functioning. It is further possible to provide synchronisation between lanes so as to avoid data skew and facilitate cross-checking of data, for instance from duplicated transducers providing input data to the lanes of a dual lane controller. The individual processors may be monitored by means of watchdog timers so as to detect faults in order to select a lane, or those parts of different lanes, which remain fully functional. Further, such a system is readily capable of being provided with expanded or extended capabilities, such as the addition of further control data processors.

At least one of the control data processors may comprise a plurality of data processors. The control task may be distributed between the data processors. Communication between the data flow controllers and the control data processors may be via a parallel or serial data link.

When control passes from one lane to another, the control data processor of the newly selected lane can take over control with minimal delay since it has had access to all input data and can be operated in accordance with the control software which was in use in the processor previously in control.

By adopting data processors in the interfaces, it is possible to divide the computing tasks of input/output management and control between the two processors in each lane. Such an arrangement may readily be adapted to specific requirements. For instance, should both control data processors fail, it is possible to allow the controller to operate in a simplified mode by incorporating suitable software in the interface data processors so as to give a limited but acceptable operational mode.

BRIEF DESCRIPTION OF THE DRAWINGS

The invention will be further described, by way of example, with reference to the accompanying drawings, in which.

Figure 1:
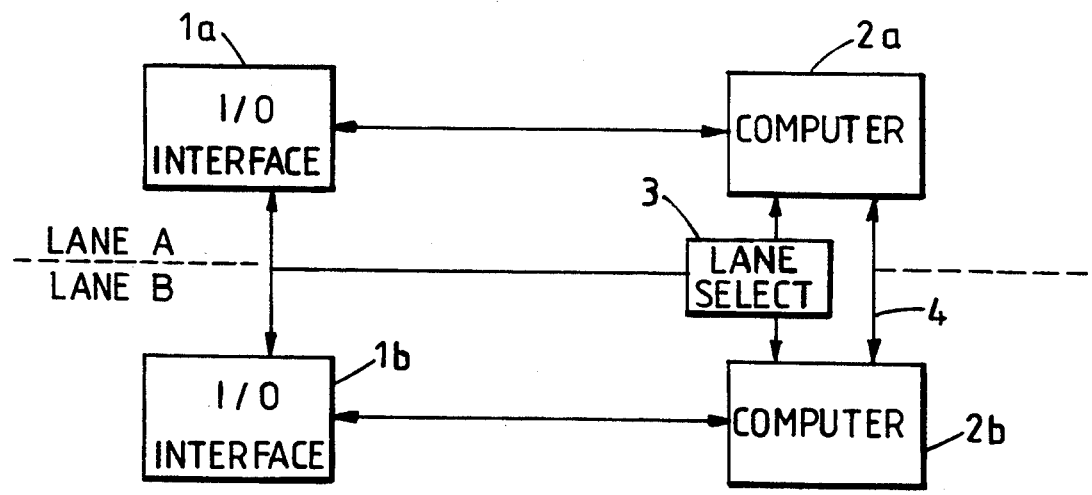
FIG. 1 is a block schematic diagram of a first type of known dual lane controller.
Figure 2:
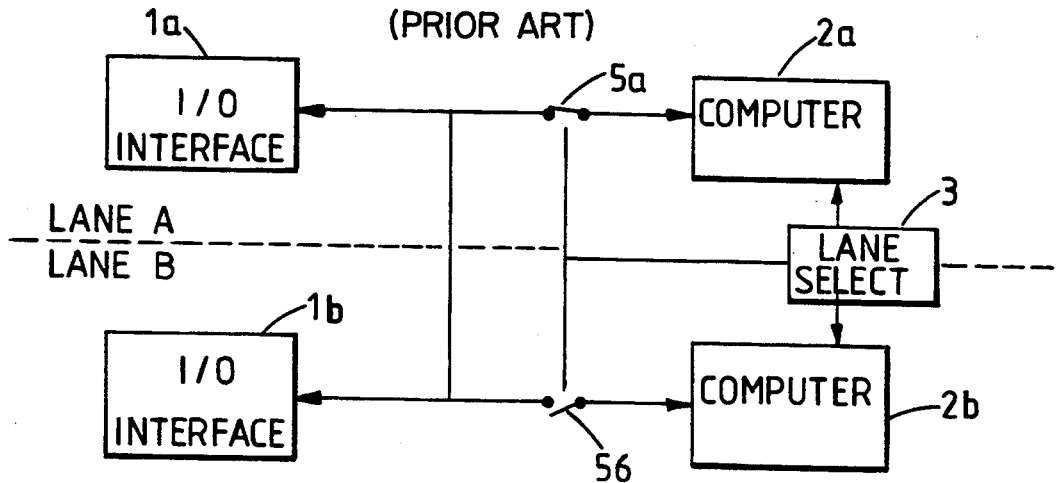
FIG. 2 is a block schematic diagram of a second type of known dual lane controller.

Like reference numerals refer to like parts throughout the drawings. Further, as lanes A and B are substantially identical, the components of only one lane will be described in detail. The parts of lane A are referred to by reference numerals with a subscript "a" and the corresponding parts of lane "B" are referred to by the same reference numerals with a subscript "b".

DETAILED DESCRIPTION OF THE PREFERRED EMBODIMENTS

Figure 3:
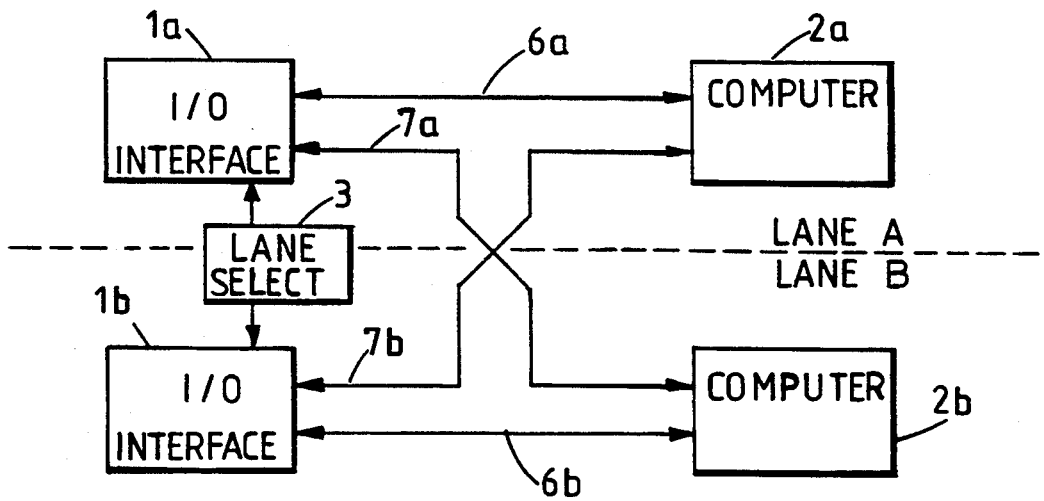
FIG. 3 is a block schematic diagram of a dual lane controller constituting an embodiment of the present invention.

The dual lane controller shown in FIG. 3 comprises lane A having an input/output interface 1a and a computer 2a, and lane B having an input/output interface 1b and a computer 2b. A lane select circuit 3 controls which of the lanes A and B is in control and which is in standby.

The interface 1a is connected to the computer 2a by a bidirectional bus 6a for exchanging input and output data, with the bus 6b serving the corresponding purpose in the lane B. In addition, the interface 1a is connected by a similar bidirectional bus 7a to the computer 2b whereas the interface 1b is connected by a corresponding bus 7b to the computer 2a.

Thus, both the computers 2a and 2b receive all of the input data from both of the interfaces 1a and 1b. In addition, both of the computers 2a and 2b are capable of supplying output data to both of the interfaces 1a and 1b. However, the lane selector circuit 3 ensures that only one of the interfaces is active for supplying output control data, output control data from the other interface being inhibited.

Both the computers 2a and 2b perform substantially the same functions and, in particular, derive output data from the same input data. At any one time, one of the lanes is in control and the other is in standby. Should a failure occur in the lane which is presently in control, the lane selector 3 can inhibit that lane and pass control to the other lane. The computer of the other lane then assumes control with minimum delay as it has been performing substantially the same operations as the computer of the other lane, so that lane changeover from standby to control occurs with minimum delay and disruption.

Figure 4:
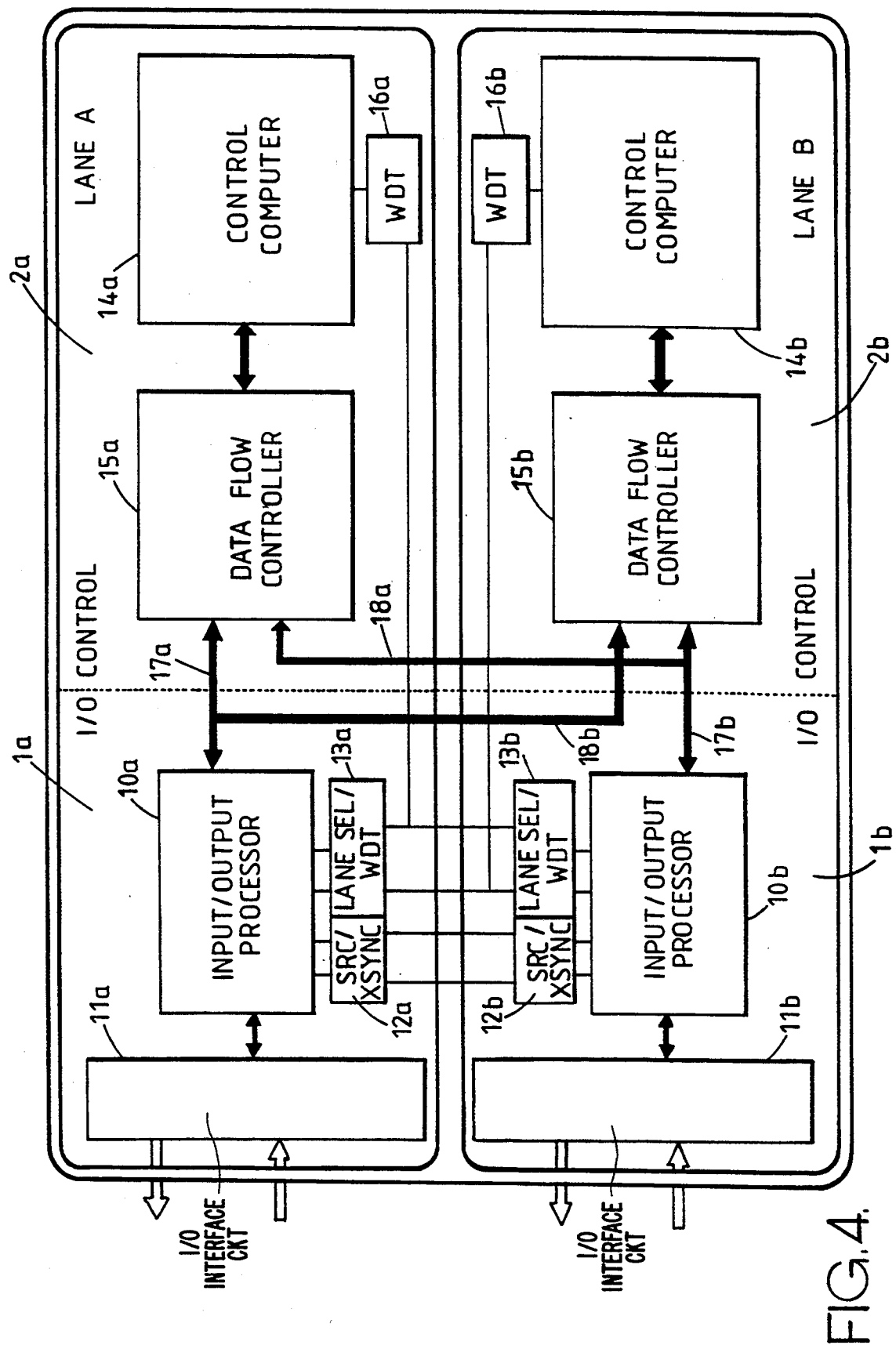
FIG. 4 is a more detailed block schematic diagram of the controller of FIG. 3.

FIG. 4 shows the dual lane controller of FIG. 3 in more detail. The input/output interface 1a comprises an input/output processor 10a connected by a bidirectional bus to an input/output interface circuit 11a. The processor 10a is provided with a sample rate clock and cross-synchronisation circuit 12a connected to the corresponding circuit 12b in the interface 1b. Further, the processor 10a is provided with a lane selector and watchdog timer 13a which is connected to the corresponding circuit 13b of the interface 1b.

The computer 2a, comprises a control computer 14a connected by a bidirectional parallel bus to a data flow controller 15a. The control computer 14a is provided with a watchdog timer 16a whose output is connected to the lane selector 13a. The data flow controller 15a is connected to the input/output processor 10a by a bidirectional bus 17a. In addition, the controller 15a is connected to the input/output processor 10b of the lane B by a bidirectional bus 18a. The controller 15a can therefore supply data to and receive data from the processors 10a and 10b of both of the lanes A and B. Each of the controllers 15a and 15b acts as a dual port random access memory (RAM).

The input/output processor 10a controls input, scaling, and validation of all external signal inputs, for instance from engine and environmental transducers, and controls the motivation of all output drives, such as torque motors for controlling fuelling. For instance, the processor 10a may perform direct control of fast response servo loops forming part of a gas turbine engine control system.

The control computer 14a receives input data via the data flow controller 15a from both of the interfaces 1a and 1b. Corresponding input data are received substantially in synchronism and may be cross-checked by the computer 14a for correspondence. The computer 14a performs the main control algorithms of the gas turbine engine and supplies output data via the controller 15a to both of the interfaces 1a and 1b for controlling operation of the engine.

The processors 10a and 10b and the computers 14a and 14b are provided with the watchdog timers 13a, 13b, 16a, and 16b which monitor the operation of the associated data processors.

At any time, one of the lanes A and B is in control and the other is in standby. Thus, if the lane A is in control, then the computer 14a receives input data from the interface 1a and, if cross-checking with the input data from the interface 1b reveals no faults, uses this data to generate output control data for the engine which is supplied to the interfaces 1a and 1b. However, the lane selectors 13a and 13b inhibit the outputs of the interface 1b whereas the output data from the computer 14a are supplied to the output of the interface 1a to actuators for controlling the engine. The sample rate clocks (SRC) are synchronised by synchronisation circuits. In the event of synchronisation circuit failure, the sample rate clocks "free run". In the event of an input/output interface losing its sample rate clock, it is declared faulty.

In the event of a fault in one of the components of the lane A in control, for instance as detected by one of the watchdog timers 13a and 16a, the lane selectors 13a and 13b cause the lane A to operate in the standby mode and the lane B to take control. Thus, output from the lane A is inhibited whereas the computer 14b processes input data to the lane B and supplies output data via the interface 1b which controls actuators of the engine.

The lane selectors 13a and 13b maintain a record of which parts of the controller are faulty. For instance, if a fault occurred in the computer 14a to cause control to pass to the lane B, and if a fault subsequently occurs in the processor 10b of the lane B, the lane selectors 13a and 13b disable the processor 10b and enable the processor 10a of the lane A. Thus, input data from the interface 1a are supplied to the control computer 14b via the data flow controller 15b, and output data for controlling the engine are supplied via the controller 15b and the interface 1a to the actuators connected to the lane A. It is also possible to divide the individual sections of the interfaces 1a and 1b so that failure of one portion of one lane and a dissimilar portion of the other lane will not prevent the controller from continuing to control operation of the engine.

Thus, a single failure in any of the duplicated parts does not prevent the controller from continuing to control operation of the engine. Also, the controller can continue to operate if multiple failures occur, provided that corresponding parts in different lanes do not fail or develop a fault simultaneously. Further, the processors 10a and 10b may be arranged, in the event of failure of both of the computers 14a and 14b, to provide limited engine control, for instance to allow "limp home" control. The dual lane controller therefore provides a high degree of immunity to faults and improved reliability of operation of a gas turbine engine.

Figure 5:
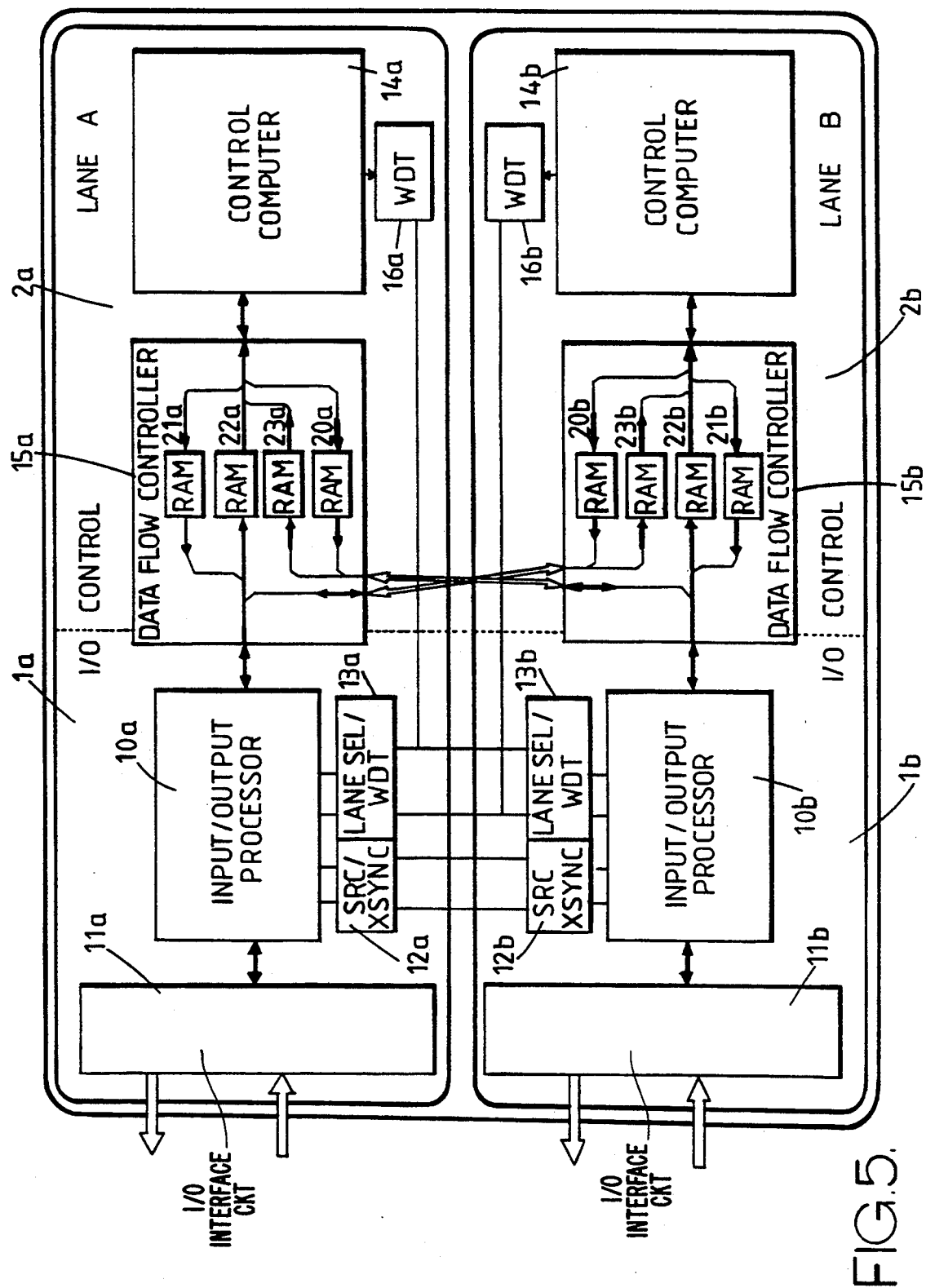
FIG. 5 is similar to FIG. 4 but shows further detail.

FIG. 5 shows the dual port RAM structure of the data flow controllers 15a and 15b in more detail. The controller 15a comprises a first random access memory 20a having a read output connected to the processor 10b and a write input connected to the output of the computer 14a. A random access memory 21a has a read output connected to the processor 10a and a write input connected to the computer 14a. A random access memory 22a has a write input connected to the processor 10a and a read output connected to the computer 14a. A random access memory 23a has a write input connected to the processor 10b and a read output connected to the computer 14a.

Thus, the control computer 14a can receive input data from the processor 10a via the memory 22a or from the processor 10b via the memory 23a. Further, the computer 14a can send data to the processor 10a via the memory 21a or to the processor 10b via the memory 20a. The memories are arranged such that any data supplied by either of the processors 10a and 10b are simultaneously supplied to both of the computers 14a and 14b and, likewise, any data supplied by either of the computers 14a and 14b are simultaneously supplied to both of the processors 10a and 10b. This arrangement, together with the limited authority synchronisation provided in the interfaces 1a and 1b, prevents the possibility of common cause failure affecting both of the lanes A and B.

An arbitration circuit is provided for arbitrating between simultaneous read and write requests for the memories 20a to 23a. The arbitration circuit compares read and write requests for each of the memories 20a to 23a and, if read and write requests are received simultaneously or if read and write requests for the same memory location are received simultaneously, the arbitration circuit gives priority to the read request.

However, in order not to affect the operation of the data processor making the write request, the arbitration circuit causes the write request to be held temporarily in a corresponding buffer memory so that it can be serviced as soon as the read request has been serviced. Each of the memories 20a to 23a is arranged such that only one data processor can write to it and only one other data processor can read from it. The arrangement of the arbitration circuit is sufficient to prevent two data processors from simultaneously trying to use the same piece of memory.

The hardware and/or software of the computers 14a and 14b may be identical or may differ whilst still providing the same control functions. Thus, although the standby computer may be arranged to perform identical control calculations as the computer in control using data from the lane in control, the standby processor may be arranged to have parameters, such as integrators, which are reset to the values calculated by the computer in control during each control cycle.

The input/output processors 10a and 10b may be arranged to compare the output data from the computers 14a and 14b for consistency so as to verify that both computers are producing consistent results. Should a fault occur, suitable action may be taken by the processors 10a and 10b, as described hereinbefore. Thus, self-checking functions may be divided such that the computers 14a and 14b check for consistency of the operation of the processors 10a and 10b, while the processors 10a and 10b check for consistency of operation of the computers 14a and 14b.

High speed serial data links may be used to transfer data between the lanes A and B. The use of high speed serial data links reduces the number of connections required between the lanes A and B and hence offers advantages of reduced size and cost and improved reliability compared with parallel connections. Also, it is possible to achieve a high degree of isolation between the lanes with the use of such serial links. Because the address information and data are transmitted together, each data flow controller may include logic for remapping the data received from the other controller to the local random access memories. The serial link is therefore transparent to the processors 10a and 14a in the same lane when performing cross channel data transactions.

Thus, in many fault modes, the controller retains control of the gas turbine engine with minimal disruption. Further, the controller is tolerant to some faults or additional faults occurring in the data flow controllers 15a and 15b. In the event of faults occurring in both of the control computers 14a and 14b or of too many faults occurring in the data flow controllers 15a and 15b, the control functions performed in the lanes A and B are lost. However, the processors 10a and 10b are arranged to detect this and to implement software for providing limited control of the gas turbine engine. In this mode, although the engine is not operated under optimal conditions, it is possible for the engine to operate in a "limp home" mode, for instance by permitting "manual" control of the engine.

We claim:

1. A multi-lane controller comprising:
a first lane; a second lane; and a lane selector; said first lane comprising a first control data processor, a first data flow controller, a first signal path, a first input/output interface connected to said first data flow controller by said first signal path, a first lane input, and a first lane output, said first control data processor being connected via said first data flow controller, said first signal path, and said first input/output interface to said first lane input and said first lane output; said second lane comprising a second control data processor, a second data flow controller, a second signal path, a second input/output interface connected to said second data flow controller by said second signal path, a second lane input, and a second lane output, said second control data processor being connected via said second data flow controller, said second signal path, and said second input/output interface to said second lane input and said second lane output; said first data flow controller having first and second inputs connected to said first and second signal paths, respectively, to receive input data from said first and second input/output interfaces, respectively, and to supply the input data to said first control data processor, said second data flow controller having third and fourth inputs connected to said first and second signal paths, respectively, to receive the input data from said first and second input/output interfaces, respectively, and to supply the input data to said second control data processor, said first and second data flow controllers being arranged to supply output data from said first and second control data processors to said first and second input/output interfaces, respectively; said data flow controller of each one of said lanes comprising first to fourth read/write memories having respective write inputs and read outputs, said first read/write memory having a write input connected to said control data processor of said one lane and a read output connected to said interface of said one lane, said second read/write memory having a write input connected to said control data processor of said one lane and a read output connected to said interface of an other of said lanes, said third read/write memory having a write input connected to said interface of said one lane and a read output connected to said control data processor of said one lane, and said fourth read/write memory having a write input connected to said interface of said other lane and a read output connected to said control data processor of said one lane; and said lane selector being arranged to permit the supply of output data to said lane output of one of said first and second lanes and to inhibit the supply of output data to said lane output of another of said first and second lanes.

2. A controller as claimed in claim 1, wherein said lane selector is arranged, upon a detection of a fault in one of said lanes, to inhibit the supply of output data to said output lane of said one lane and to permit the supply of output data to said output lane of said other lane.

3. A controller as claimed in claim 1, wherein said first and second data flow controllers are arranged to supply output data from said first and second control data processors to said second and first input/output interfaces, respectively.

4. A controller as claimed in claim 3, wherein said lane selector is arranged, upon detection of a fault in control data processor of said one of said lanes and a fault in said input/output interface of said other lane, to permit the supply of output data from said control data processor of said other lane via said input/output interface of said one lane to said output of said one lane.

5. A controller as claimed in claim 1, wherein each of said first and second input/output interfaces comprises an interface data processor.

6. A controller as claimed in claim 5, further comprising a sample rate clock for each of said interface data processors and synchronising means for synchronising said sample rate clocks.

7. A controller as claimed in claim 6, further comprising a respective watch dog timer provided for each of said control data processors and said interface data processors, each of said respective watchdog timers having an output connected to said lane selector.

8. A controller as claimed in claim 1, wherein said first and second control data processors are arranged, upon detection of a fault in a part of one of said first and second data flow controllers, to inhibit the use of data transferred via said part.

9. A controller as claimed in claim 1, wherein said first and second input/output interfaces are arranged, upon detection of a fault in a part of one of said first and second data flow controllers, to inhibit the use of data transferred via said part.

* * * * *